(12) United States Patent
Chandhok et al.

(10) Patent No.: US 8,930,315 B2
(45) Date of Patent: Jan. 6, 2015

(54) USING A DATA PROTECTION SERVER TO BACKUP AND RESTORE DATA ON VIRTUAL SERVERS

(75) Inventors: Nikhil Vijay Chandhok, Seattle, WA (US); Michael L. Michael, Kirkland, WA (US); Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/021,613

(22) Filed: Feb. 4, 2011

(65) Prior Publication Data

US 2011/0131183 A1  Jun. 2, 2011

Related U.S. Application Data

(63) Continuation of application No. 11/097,634, filed on Apr. 1, 2005, now Pat. No. 7,899,788.

(51) Int. Cl.
  *G06F 7/00* (2006.01)
  *G06F 17/00* (2006.01)
  *G06F 11/14* (2006.01)
  *G06F 9/455* (2006.01)
  *G06F 17/30* (2006.01)

(52) U.S. Cl.
  CPC .......... *G06F 11/1469* (2013.01); *G06F 9/455* (2013.01); *G06F 17/30575* (2013.01); *G06F 11/1458* (2013.01); *G06F 11/1464* (2013.01); *G06F 11/1471* (2013.01)
  USPC ....................................................... 707/640

(58) Field of Classification Search
  CPC  G06F 11/1458; G06F 9/455; G06F 17/30575
  USPC .......................................................... 707/640
  See application file for complete search history.

(56) References Cited

U.S. PATENT DOCUMENTS

| 5,435,004 | A | * | 7/1995  | Cox et al. ........................ 1/1 |
| 5,802,510 | A | * | 9/1998  | Jones ............................... 1/1 |
| 6,298,451 | B1 |   | 10/2001 | Lin |
| 6,381,631 | B1 |   | 4/2002  | van Hoff |
| 6,795,966 | B1 | * | 9/2004  | Lim et al. ..................... 718/1 |

(Continued)

OTHER PUBLICATIONS

Cox et al., "Pastiche: Making Backup Cheap and Easy", Proceedings of the 5$^{th}$ Symposium on Operating Systems Design and Implementation, Boston, Massachusetts, USA, Dec. 9-11, 2002, 37(S1), 15 pages.

*Primary Examiner* — Charles Lu
(74) *Attorney, Agent, or Firm* — Louise Bowman; Jim Ross; Micky Minhas

(57) ABSTRACT

A virtual machine may be discovered through a directory service or via an agent that is installed on the host operating system that is running the virtual machine. If the agent is installed on the virtual machine, the agent monitors changes to a set of protected volumes on the virtual machine. If the agent is installed on the host, the agent monitors changes to the protected volumes, which may contain one or more virtual servers on the host. Periodically, these changes from the host or the virtual server are sent to a data protection server. The data protection server updates its replicas of protected volumes with the sent changes. Versions of files on a data protection server corresponding to a volume of a virtual server may be restored to the virtual machine, to another machine, or may be viewed from the data protection server.

16 Claims, 13 Drawing Sheets

(56) References Cited

U.S. PATENT DOCUMENTS

| | | |
|---|---|---|
| 6,854,115 B1 | 2/2005 | Traversat et al. |
| 7,093,086 B1 * | 8/2006 | van Rietschote ............ 711/161 |
| 7,478,117 B1 * | 1/2009 | Lamb et al. ........................ 1/1 |
| 2003/0237083 A1 * | 12/2003 | Hasegawa et al. ............ 717/176 |
| 2004/0025072 A1 | 2/2004 | Mau |
| 2004/0064488 A1 * | 4/2004 | Sinha ............................ 707/204 |
| 2004/0128670 A1 * | 7/2004 | Robinson et al. ................. 718/1 |
| 2004/0172574 A1 | 9/2004 | Wing et al. |
| 2005/0210041 A1 | 9/2005 | Taguchi |
| 2005/0273654 A1 * | 12/2005 | Chen et al. ...................... 714/13 |
| 2006/0225065 A1 | 10/2006 | Chandhok et al. |

\* cited by examiner

USING A DATA PROTECTION SERVER TO BACKUP AND RESTORE DATA ON VIRTUAL SERVERS

CROSS-REFERENCE TO RELATED APPLICATIONS

This application is a continuation of U.S. patent application Ser. No. 11/097,634, filed Apr. 1, 2005, the contents of which is incorporated by reference herein in its entirety.

TECHNICAL FIELD

The invention relates generally to computers, and more particularly to backups and restores of data.

BACKGROUND

With the multitude of operating systems and versions thereof, developers have created software that provides virtual machines. A virtual machine is a software-created environment that may appear, to the operating system and applications that execute therein, to have most or all the elements associated with an actual PC. The software-created environment may be so complete that the operating system and applications that execute on a virtual machine may not be able to determine that they are executing in a virtual environment.

Providing virtual machines is useful for many reasons including debugging and supporting applications designed to execute on multiple versions of one or more operating systems, having access on a single machine to applications that are only available for different operating systems, and so forth. To execute multiple operating systems on one actual computer, a user may load a primary operating system on the computer, load software to create one or more virtual machines, and then load one or more other operating systems that execute in the one or more virtual machines. This allows, for example, an Apple® (or another) operating system to provide a virtual machine to host a Microsoft® operating system, a UNIX® operating system, a LINUX® operating system, another Apple® operating system, or some other operating system.

Virtual machines may be associated with volumes on which they store and access data. What is needed is a method and system for backing up and restoring data to virtual machines, particularly when they are used as servers.

SUMMARY

Briefly, the present invention provides a method and system for backing up and restoring the data of virtual machines. A virtual machine may be discovered through a directory service or via an agent that is installed on the host operating system that is running the virtual machine. If the agent is installed on the virtual machine, the agent monitors changes to a set of protected volumes on the virtual machine. If the agent is installed on the host, the agent monitors changes to the protected volumes, which may contain one or more virtual servers on the host. Periodically, these changes from the host or the virtual server are sent to a data protection server. The data protection server updates its replicas of protected volumes with the sent changes. Versions of files on a data protection server corresponding to a volume of a virtual server may be restored to the virtual machine, to another machine, or may be viewed from the data protection server.

Other aspects will become apparent from the following detailed description when taken in conjunction with the drawings, in which:

DETAILED DESCRIPTION OF ILLUSTRATIVE EMBODIMENTS

Exemplary Operating Environment

Figure 1:
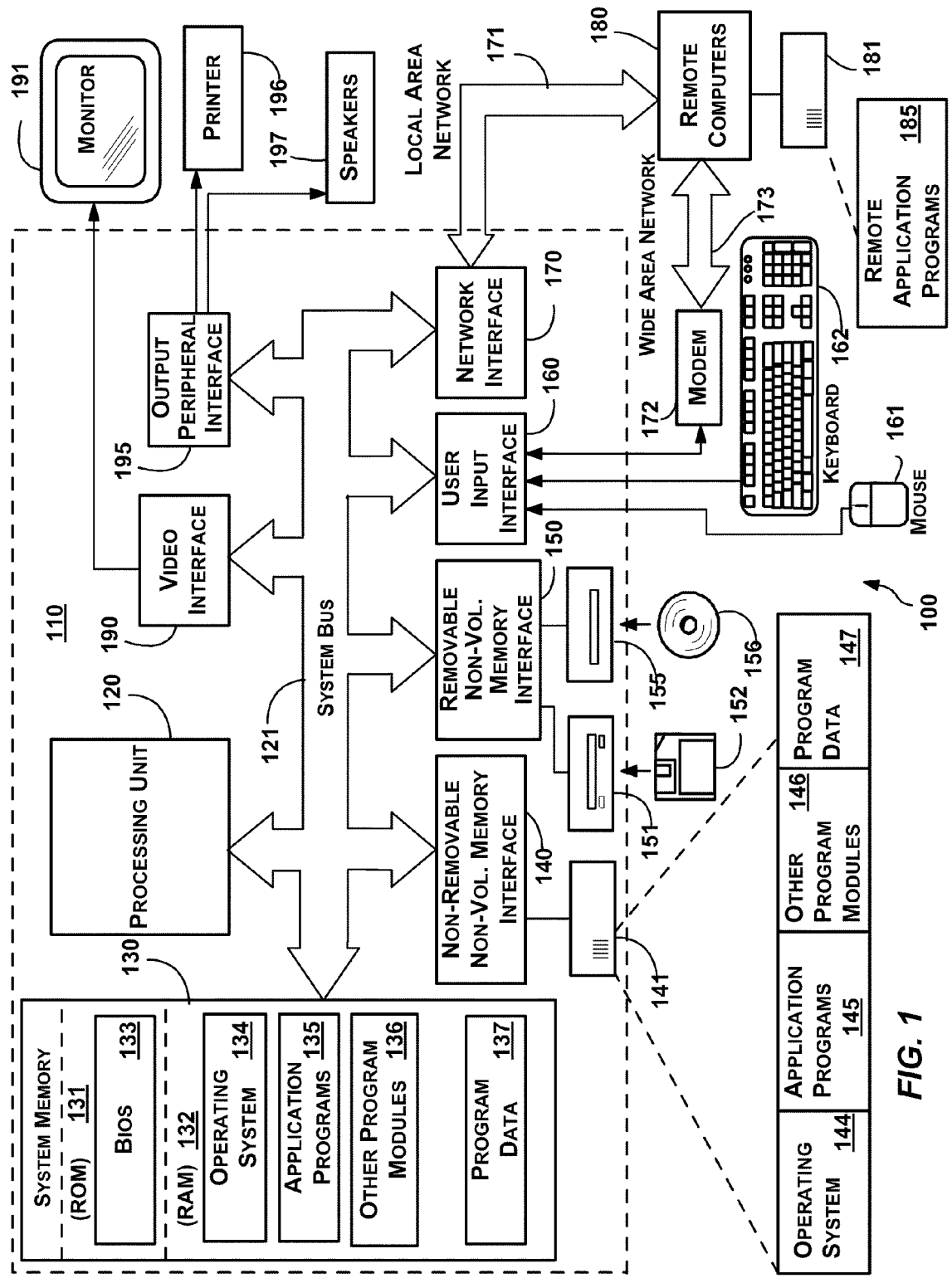
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Backups and Restores

Figure 2:
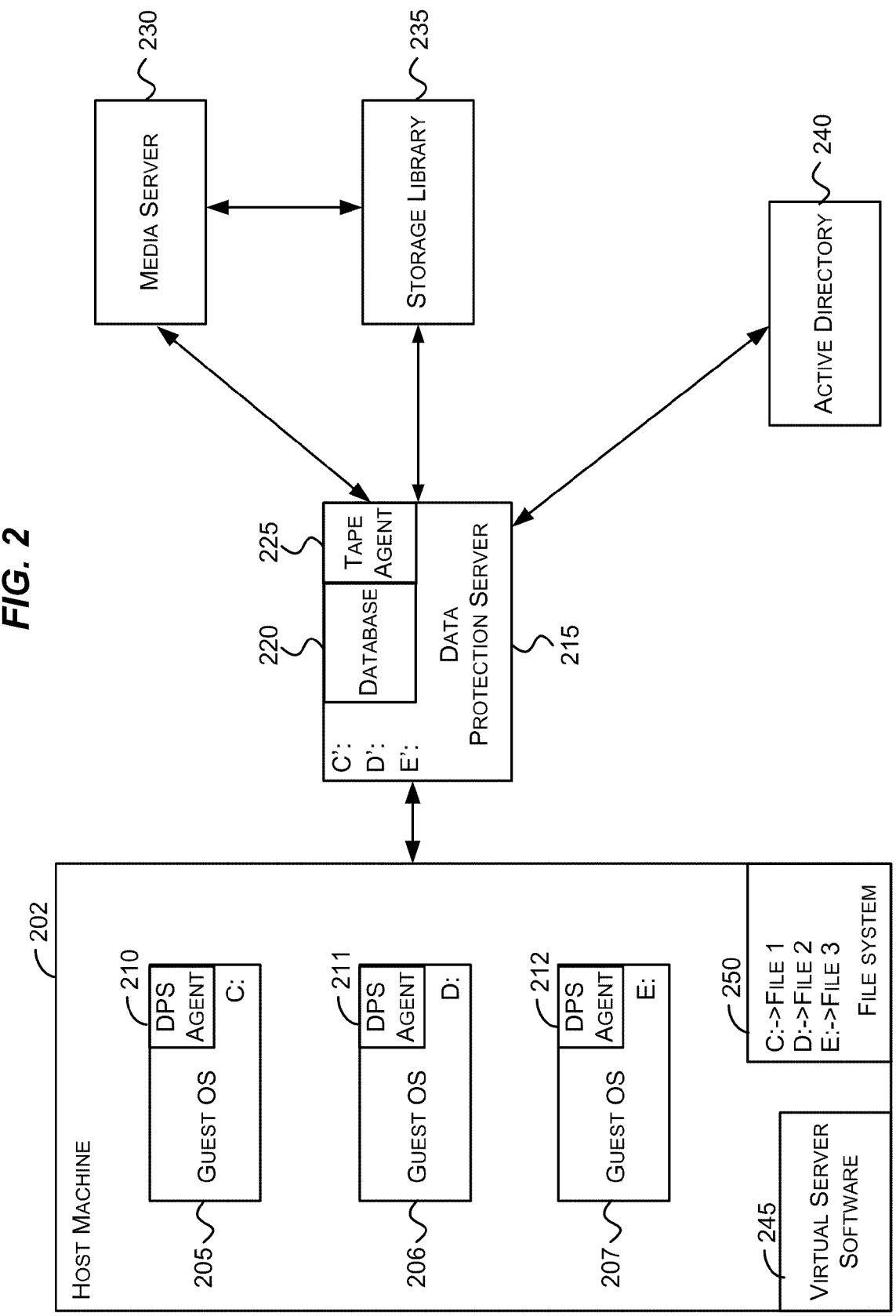
FIG. 2 is a block diagram representing an exemplary environment in which the present invention may operate in accordance with various aspects of the invention.

FIG. 2 is a block diagram representing an exemplary environment in which the present invention may operate in accordance with various aspects of the invention. The environment includes a host machine 202, a data protection server 215, a media server 230, a storage library 235, and an active directory 240. The host machine 202 includes virtual server software 245, a file system 250, and virtual machines 205-207 which each include a data protection server (DPS) agent 210-212, respectively. The data protection server 215 includes a database 220, and a tape agent 225. There may be more or fewer virtual machines without departing from the spirit or scope of the present invention.

The virtual machines 205-207 are hosted by the host machine 202 via the virtual server software 245, which is installed on the host machine 202. The virtual server software 245 provides an environment in which virtual machines may be installed and hosted.

Each virtual machine may have one or more configuration files that are associated with it to define the virtual machine. The virtual machines 205-207 may also have volumes associated with them, such as volumes C, D, and E of virtual machines 205-207, respectively. These volumes may be represented as files on the file system 250 of the host machine 202.

The file system 250 of the host machine 202 may be a set of hard drives and/or other storage media that are located on the host machine 202 and/or other separate machines that expose volumes to the host machine 202. For example, the host machine may have volumes in its file system 250 that are stored on a storage area network (SAN).

The operating system of the host machine 202 is sometimes referred to as the host OS or simply as the host. The operating system that executes on each virtual machine is sometimes referred to as a guest operating system or simply as a guest.

The data protection server 215 is any device (e.g., the computer 110 of FIG. 1) that stores a copy of any data associated with one or more of the virtual machines. The data protection server 215 may discover the virtual machines 205-207 via an active directory 240. The virtual machines 205-207, particularly if they are acting as server and providing services, may register with the active directory 240 when they become available. The data protection server 215 may place virtual machines that are on the same physical host machine into a group and may apply policies to the group. Some exemplary policies include how often to replicate data from the virtual machines, how often to produce shadow copies of the replicated data on the data protection server 215, and how much data loss is acceptable. An exemplary data loss policy may indicate that 10 days worth of backup data (shadow copies) be kept on the data protection server 215.

The data protection server 215 may obtain data (both configuration and application data that resides on volumes) from the virtual machines 205-207 through DPS agents 210-212. The data protection server 215 may install the DPS agents 210-212 on the virtual machines 205-207 if after discovery it finds that any virtual machine does not have a DPS agent. After discovery, a replica of the volumes and configuration data associated with the virtual machines 205-207 is created on the data protection server 215. The DPS agents 210-212 may be implemented as file system filters that monitor changes to specified volumes associated with the virtual machines 205-207. When a file that represents a volume on a guest system is added, modified, or deleted, a DPS agent may store information regarding the addition, modification, or deletion in a log file. Shortly thereafter, or periodically, the DPS agent may send information from the log file to the data protection server 215.

Instead of creating a log file for each virtual machine and periodically sending the log file to the data protection server 215, the virtual server software 245 may provide a parent disk and a differencing disk for each of the virtual machines 205-207 hosted thereon. The parent disk stores a copy of the virtual machine's volume at a point in time, while the differencing disk stores changes to the volume that have occurred since that time. Periodically, the differencing disk may be merged with the parent disk to create a new parent disk. When the differencing disk is merged with the parent disk (and before the differencing disk is discarded), the DPS agent 405 may transmit the differencing disk to the data protection server 215.

Upon receiving each differencing disk, the data protection server 215 may merge the differencing disk with its corresponding parent disk stored on the data protection server 215 and may then create a shadow copy (as described below) of the new parent disk. Alternatively, the data protection server 215 may store the differencing disks and may create a new disk by merging multiple differencing disks with the parent disk upon request.

Periodically, the data protection server 215 may create a shadow copy of each volume used to store data from the virtual machines 205-207. A shadow copy is a point-in-time "snapshot" of a volume. Logically, a shadow copy is an exact duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume. In addition, a shadow copy may be exposed through a network remote path such as a network share (sometimes referred to simply as a "share") associated with it that allows access from a network to a portion or all of the data contained within the shadow copy.

A shadow copy may be created by various well-known techniques, including copy-on-write, split mirror, specialized hardware that creates a copy of the disk itself, and other methods and systems known to those skilled in the art.

Periodically creating shadow copies of volumes on the data protection server 215 corresponding to volumes on virtual machines provides a convenient and efficient mechanism for storing and accessing previous versions of files stored on the volumes. If a user changes a file on a virtual machine and decides that he or she does not like the changes, the user may obtain a previous version of the file from the data protection server 215 via the shadow copies. For example, if new shadow copies are created each night, a user may obtain a copy of the changed file as it existed on any given day by selecting the appropriate shadow copy and indicating the desired file.

To obtain the desired file, the data protection server 215 may parse the shadow copy of the volume corresponding to the virtual machine's volume and determine what files exist on the shadow copy. The data protection server 215 may then provide a directory structure to a requesting application which may be browsed by the user to select and recover the desired file. The data protection server 215 may then communicate the desired file to the DPS agent 405 on the host machine 202 (as described in FIG. 4) or a DPS agent of a virtual machine. The DPS agent may then restore the file to the virtual machine.

Alternatively, the file may be communicated to another computer so that the user may operate on the file as desired outside of a virtual machine environment.

Periodically, the storage on the data protection server 215 may become full or a copy of the data may need to be taken offsite. To archive data contained on the data protection server 215, shadow copies contained on the data protection server 215 may be used to backup data contained on the data protection server 215 to a storage library such as storage library 235.

The storage library 235 comprises storage into which data from data protection server 215 may be archived. The storage library 235 may include tapes, CDs, DVDs, hard drives, optical devices, any other storage media, or any combination thereof. The storage library may be directly attached to the data protection server 215 or may be reachable over a network.

The media server 230 may interact with the data protection server 215 (e.g., through the tape agent 225) and the storage library 235 to backup data on the data protection server 215. A user may manage backups via the media server 230.

In some embodiments, the media server 230 and the storage library 235 reside on the same device. In some embodiments, the media server 230 and the storage library 235 reside on the data protection server 215.

Figure 3:
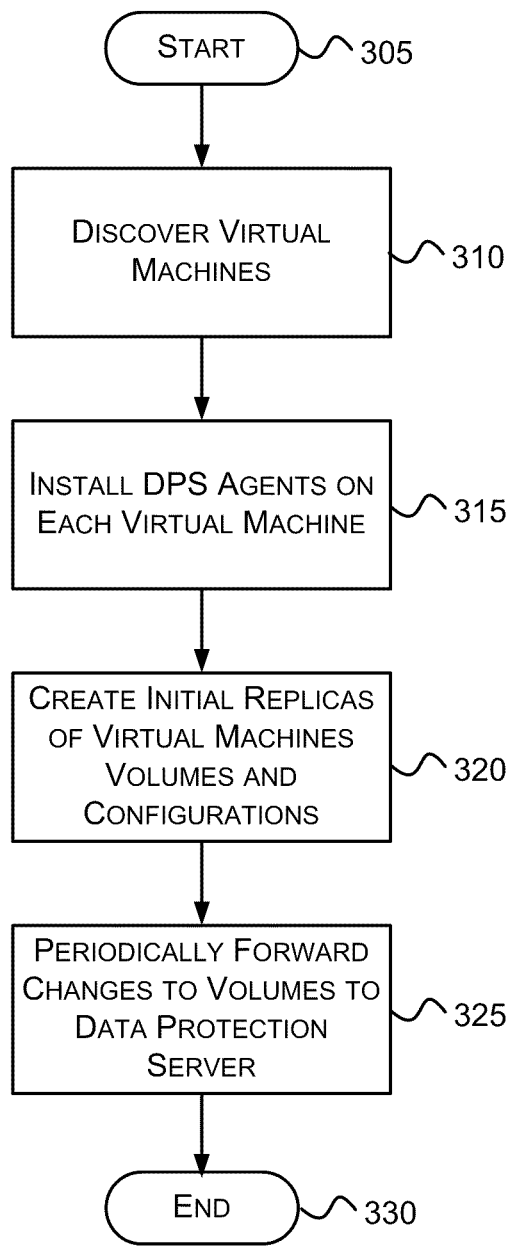
FIG. 3 is a flow diagram generally representing actions that may occur when backing up virtual machines. At block 305, the actions begin.

FIG. 3 is a flow diagram generally representing actions that may occur when backing up virtual machines. At block 305, the actions begin.

At block 310, the data protection server discovers the virtual machines. This may be done, for example through a directory service.

At block 315, the data protection server installs a DPS agent on each virtual machine that does not already have a DPS agent.

At block 320, initial replicas of the virtual machines' volumes and configuration data are created and stored on the data protection server.

At block 325, periodically, changes to volumes of the virtual machines are forwarded to the data protection server. After the data protection server receives changes or on a periodic basis, the data protection server may create shadow copies of the replicas stored thereon.

At block 330, the actions end.

Figure 4:
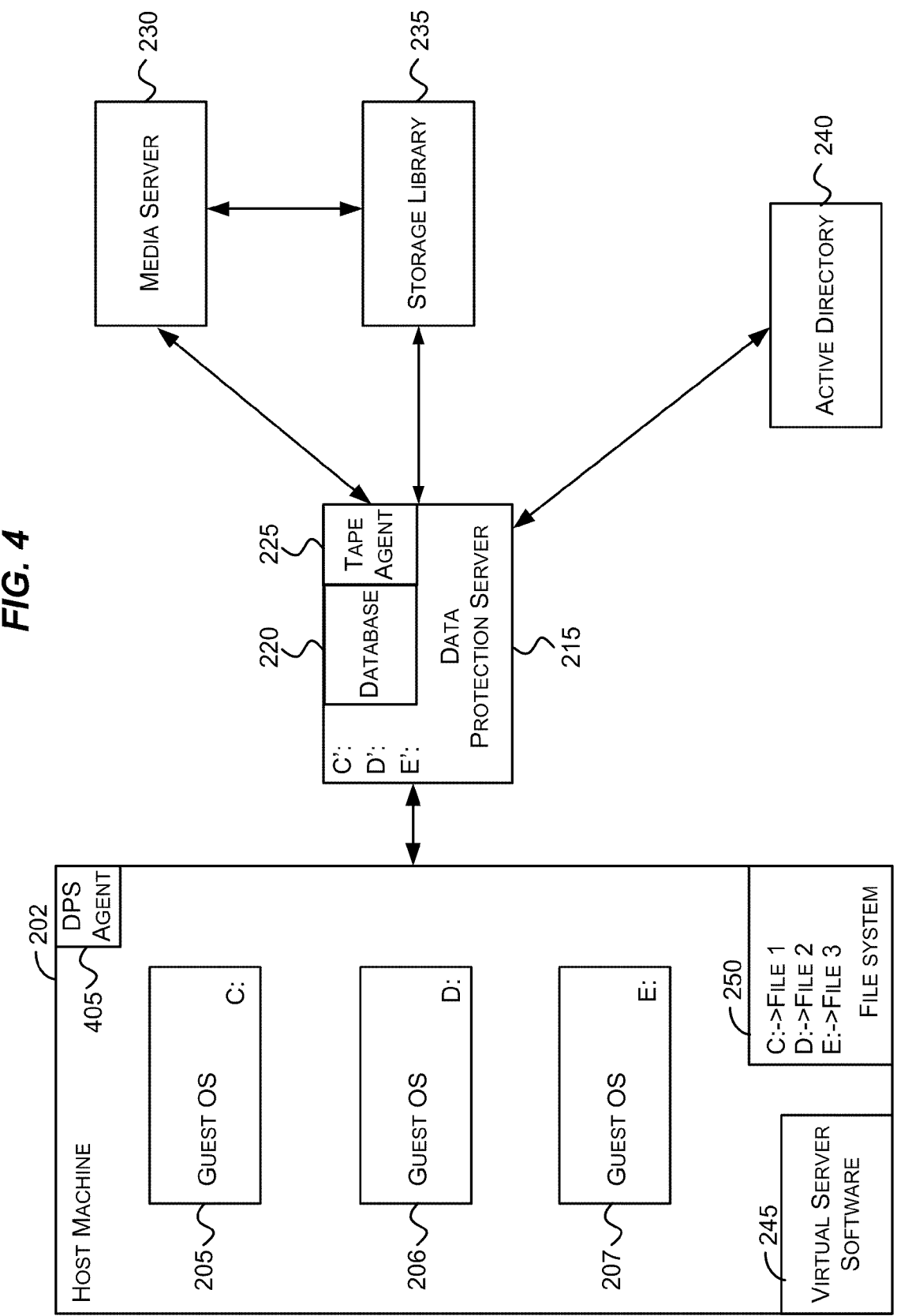
FIG. 4 is a block diagram representing another exemplary environment in which the present invention may operate in accordance with various aspects of the invention.

FIG. 4 is a block diagram representing another exemplary environment in which the present invention may operate in accordance with various aspects of the invention. The environment includes a host machine 202, a data protection server 215, a media server 230, a storage library 235, and an active directory 240. The host machine 202 includes virtual server software 245, a file system 250, and hosts virtual machines 205-207. The host machine 202 may also include a DPS agent 405.

The data protection server 215 may discover the host machine 202 through the active directory 240. After discovery, the data protection server 215 installs the DPS agent 405 on the host machine 202 (if it is not already installed thereon).

The DPS agent 405 discovers that the host machine 202 is running virtual server software and it includes virtual machines 205-207. In one embodiment, the DPS agent 405 is able to read configuration files associated with virtual server software to determine the volumes and configuration data associated with the virtual machines 205-207 and their corresponding files in the file system 250. In another embodiment, the DPS agent 405 communicates with the virtual server software 245 to obtain this information.

The environment shown in FIG. 4 differs from that shown in FIG. 2 in part in that the data protection server 215 installs a DPS agent 405 on the host machine 202 and does not install DPS agents on each of the virtual machines 205-207. In one embodiment, an administrator or the like selects volumes of the file system 250 of the host machine 405 to protect by copying to the data protection server 215 via the DPS agent 405. If the selected volumes include the files that are used to represent the virtual machines 205-207's volumes and configuration data, then these virtual machines are also protected by the data protection server 215.

In another embodiment, a system administrator, automated process, or the like is provided with the opportunity (e.g., via a user interface or API) to protect the volumes of the individual virtual machines 205-207 (which may be represented as files on the host machine 202). In one embodiment, the system administrator or the like may be presented with a user interface that indicates the virtual machines 205-207 on the host machine 202 and allows the system administrator to select which virtual machines to protect. If a system administrator selects a virtual machine, the file and configuration data corresponding to the virtual machine are protected by the data protection server 215.

Figure 5:
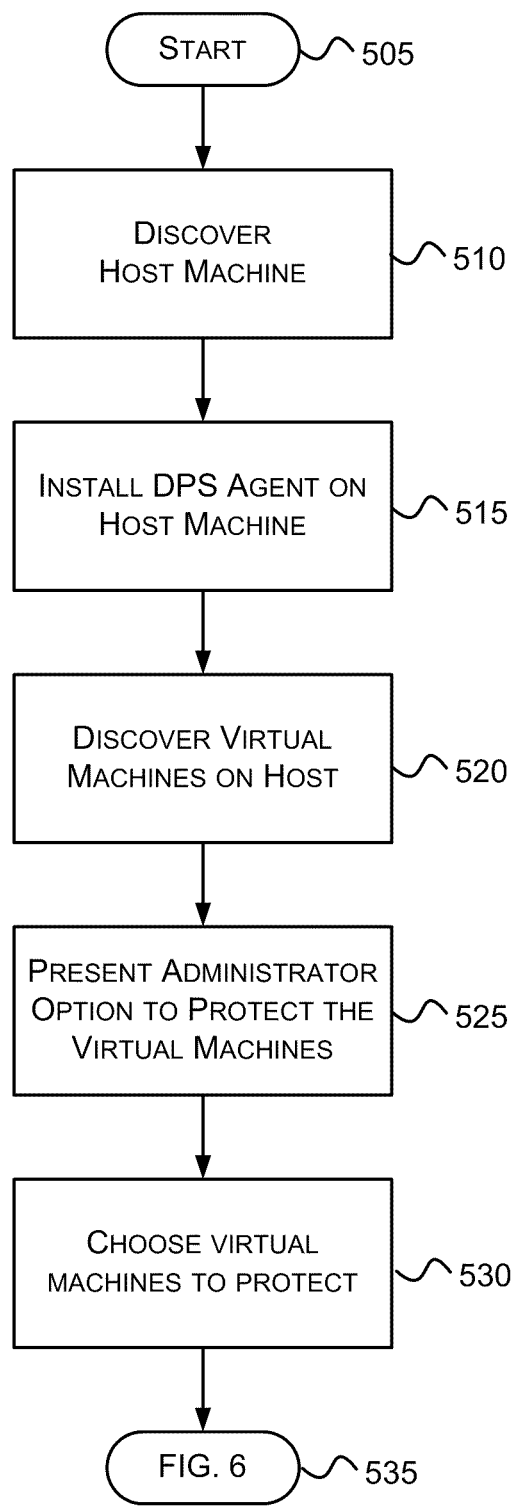
FIG. 5 is a flow diagram that generally represents actions that may occur to protect virtual machines on a host machine in accordance with various aspects of the invention.

FIG. 5 is a flow diagram that generally represents actions that may occur to protect virtual machines on a host machine in accordance with various aspects of the invention. At block 505, the actions start.

At block 510, the host machine is discovered. This may be done by consulting a directory (e.g., Active Directory 240 of FIG. 4).

At block 515, a DPS agent is installed on the host machine. At block 520, the DPS agent discovers the virtual machines on the host machine and communicates these virtual machines to the data protection server. The DPS agent may discover the virtual machines by communicating with a virtual service process that is in charge of storing information regarding the virtual machines on the host machine, for example.

At block 525, an administrator or the like is presented with a user interface that allows the administrator to select the virtual machines to protect. At block 530, the administrator selects the virtual machines to protect.

Figure 6:
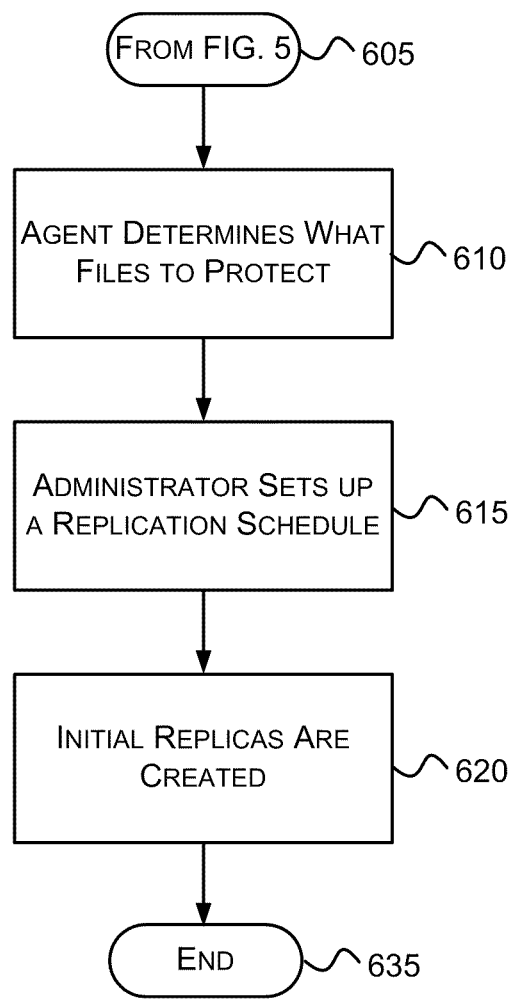
FIG. 6 is a flow diagram that is a continuation of the flow diagram of FIG. 5. Block 605 represents that the actions are a continuation of the actions associated with FIG. 5.

Block 535 represents that the actions continue at FIG. 6.

FIG. 6 is a flow diagram that is a continuation of the flow diagram of FIG. 5. Block 605 represents that the actions are a continuation of the actions associated with FIG. 5.

At block 610, the DPS agent on the host machine determines which files to protect based on the virtual machines selected by the administrator or the like. The DPS agent may communicate with a virtual service to find out which files correspond to the selected virtual machines.

At block 615, an administrator or the like sets up a replication schedule. The schedule indicates how often changes to the protected files should be sent from the host machine to the data protection server.

At block 620, initial replicas are created of the virtual machines volumes and configuration data. These replicas are exact copies of the virtual machine volumes and configuration data at the time they are taken.

At block 635, the actions end. At this point, the virtual machines have been discovered, DPS agents have been installed thereon, and initial replicas of the virtual machines volumes and configuration data have been created.

Figure 7:
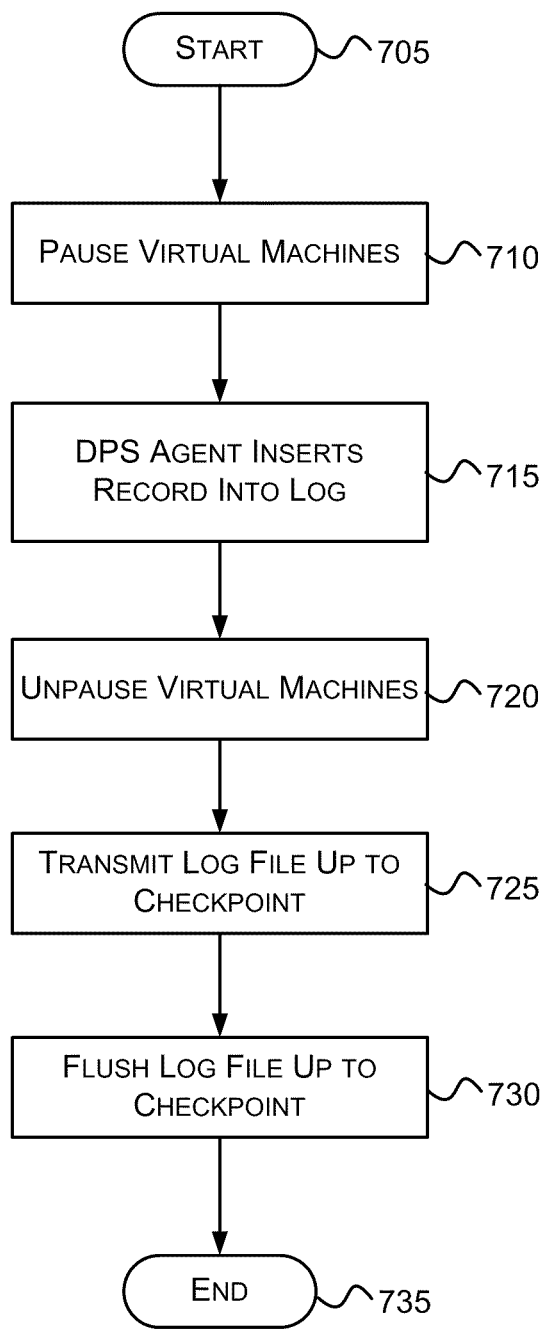
FIG. 7 is a flow diagram that generally represents actions that may occur when creating shadow copies of volumes on a data protection server that correspond to volumes of virtual machines after the initial replicas of the virtual machines volumes have been obtained in accordance with various aspects of the invention.

FIG. 7 is a flow diagram that generally represents actions that may occur when creating shadow copies of volumes on a data protection server that correspond to volumes of virtual machines after the initial replicas of the virtual machines volumes have been obtained in accordance with various aspects of the invention. At block 705, the actions start.

At block 710, the DPS agent on the host machine pauses the virtual machines. The DPS agent may do so by communicating with a virtual service on the host machine. When a virtual machine is paused, the virtual machine ensures that the volumes it is associated with are in a crash consistent state (i.e., data is valid and not corrupted). This means that the virtual server could be restored in a consistent manner from the data stored on its associated volumes. To place itself in a crash consistent state, the virtual machine may or may not flush various data it holds in volatile memory.

At block 715, the DPS agent on the host machine inserts a record (e.g., a checkpoint) into the log file that tracks changes to the host machine's file system. At the checkpoint, the data stored on the host machine for each virtual machine residing thereon is in a crash consistent state.

At block 720, the virtual machines are un-paused and can resume normal operations. Inserting a record into the log and restarting the virtual machines immediately thereafter (instead of attempting to copy the volumes associated with the virtual machines) may greatly decrease the down time of the virtual machines.

At block 725, the DPS agent transmits the log file up to the checkpoint to the data protection server. The data protection server may then use the log file to bring the volumes on the data protection server that correspond to the virtual machines volumes up-to-date with the virtual machines as of the time that the record was inserted into the log file. Afterwards, the data protection server may create a shadow copy of the volumes.

At block 730, the log file is flushed up to the checkpoint to reduce space consumed by the log file.

At block 735, the actions end.

Figure 8:
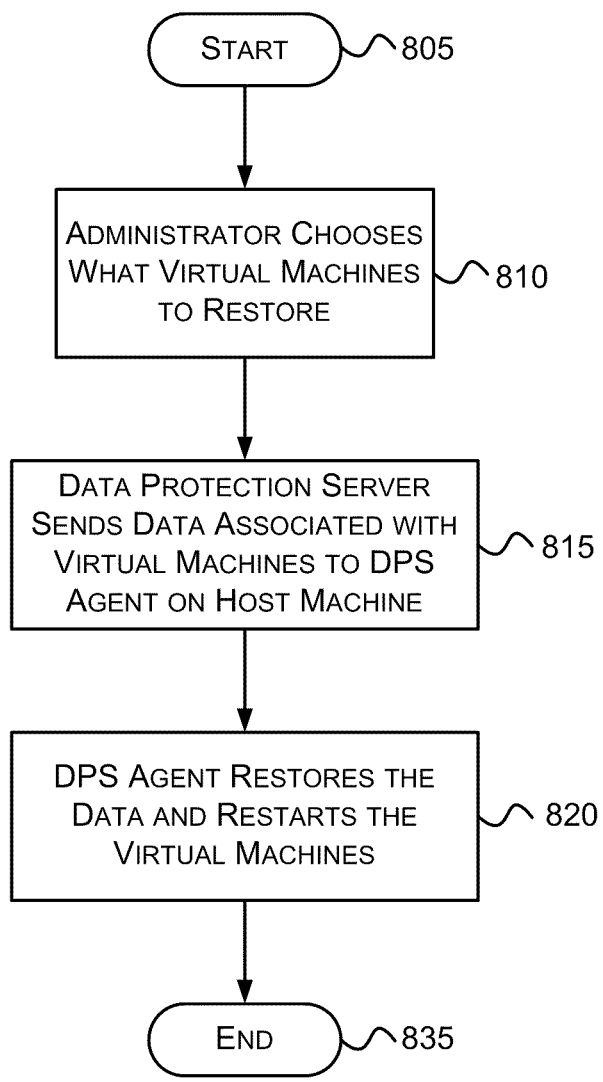
FIG. 8 is a flow diagram that generally represents actions that may occur to restore one or more virtual machine in accordance with various aspects of the invention.

FIG. 8 is a flow diagram that generally represents actions that may occur to restore one or more virtual machines in accordance with various aspects of the invention. At block 805, the actions begin.

At block 810, an administrator chooses what virtual machines to restore. The administrator may do so through the use of a user interface that shows virtual machine configuration data and volumes protected by the data protection server.

Before restoring the virtual machine data and configuration to the host, the data protection server may inspect the integrity of the virtual machine data in response to a policy set by the administrator. An exemplary inspection policy may indicate that a shadow copy including the virtual machine data be mounted on a local volume, analyzed, and fixed, if necessary, before recovering the data to the host. Analyzing the virtual machine data may include running a file system diagnostic tool and virus detection software on the virtual machine shadow copy and repairing any issues found prior to recovering the data to the host.

At block 815, the data protection server sends the data associated with the selected virtual machines to the DPS agent on the host machine.

At block 820, the DPS agent on the host machine restores the data (volumes and configuration), registers the virtual machines with the virtual server service, and restarts the virtual machines associated with the data.

At block 835, the actions end.

Figure 9:
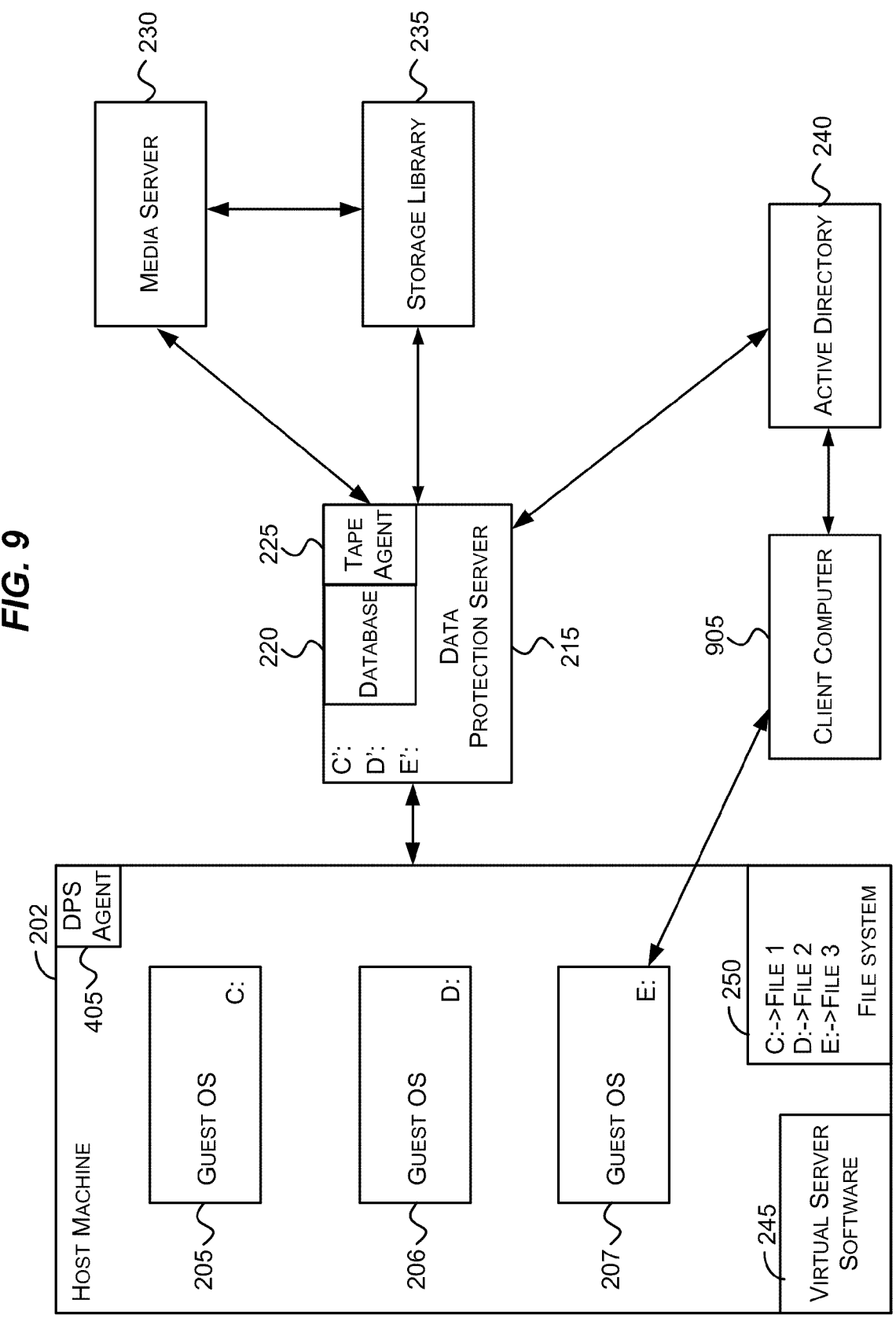
FIG. 9 is a block diagram representing another exemplary environment in which the present invention may operate in accordance with various aspects of the invention.

FIG. 9 is a block diagram representing another exemplary environment in which the present invention may operate in accordance with various aspects of the invention. In addition to the components included in FIG. 4, a client computer 905 is shown. The client computer 905 has a network share to a volume (e.g., volume E) of a virtual machine 207. A user using the client computer 905 may wish to restore a file to the virtual machine 207. To do so, a user may select a previous version of the file from a user interface of the client computer 905. To obtain a list of previous versions, the client computer 905 may communicate with the active directory 240 and provide the name of the share the client computer 905 uses to access data on the virtual machine 207.

The active directory 240 may include a mapping that maps a machine where files reside to another machine where a copy of the files resides. For example, the mapping may associate virtual server name and share with a data protection server name and share. This mapping may be populated to indicate that shadow copies of the virtual server 205-207's volumes reside on the data protection server 215.

Figure 10:
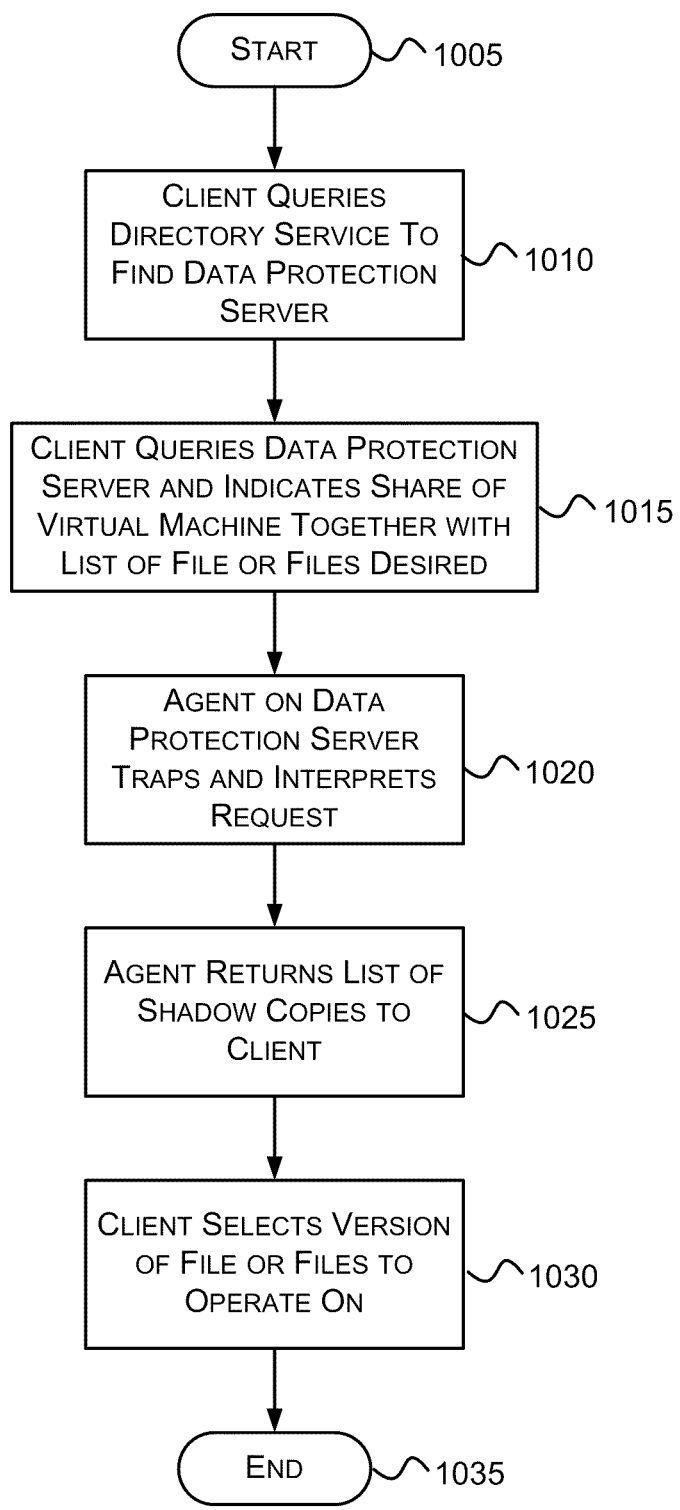
FIG. 10 is a flow diagram generally representing actions that may occur in obtaining a previous version of a file of a virtual machine in accordance with various aspects of the invention.

FIG. 10 is a flow diagram generally representing actions that may occur in obtaining a previous version of a file of a virtual machine network share in accordance with various aspects of the invention. At block 1005, the actions start.

At block 1010, a client (e.g., client computer 905 of FIG. 9) queries a directory service (e.g., active directory 240 of FIG. 9) to determine a data protection server corresponding to a share. The client provides the directory service the share. In response, the directory service returns a machine name and path of a data protection server that protects data associated with the share.

At block 1015, the client queries the data protection server, and provides the share to the virtual machine and a list of file or files desired.

At block 1020, an agent (e.g., process) on the data protection server traps and interprets the request. The agent then finds the available shadow copies that correspond to the volumes that contain the data for the virtual machine the client is requesting, mounts the volumes on the data protection server that correspond to the volumes on the virtual machine, and returns a list of shadow copies (including dates of the shadow copies) to the client.

At block 1025, the agent returns the list of shadow copies to the client.

At block 1030, the client uses the list to select the version of the file or files to restore to the virtual server, to another location selected by the client, or to open for viewing by the client.

At block 1035, the actions end.

Figure 11:
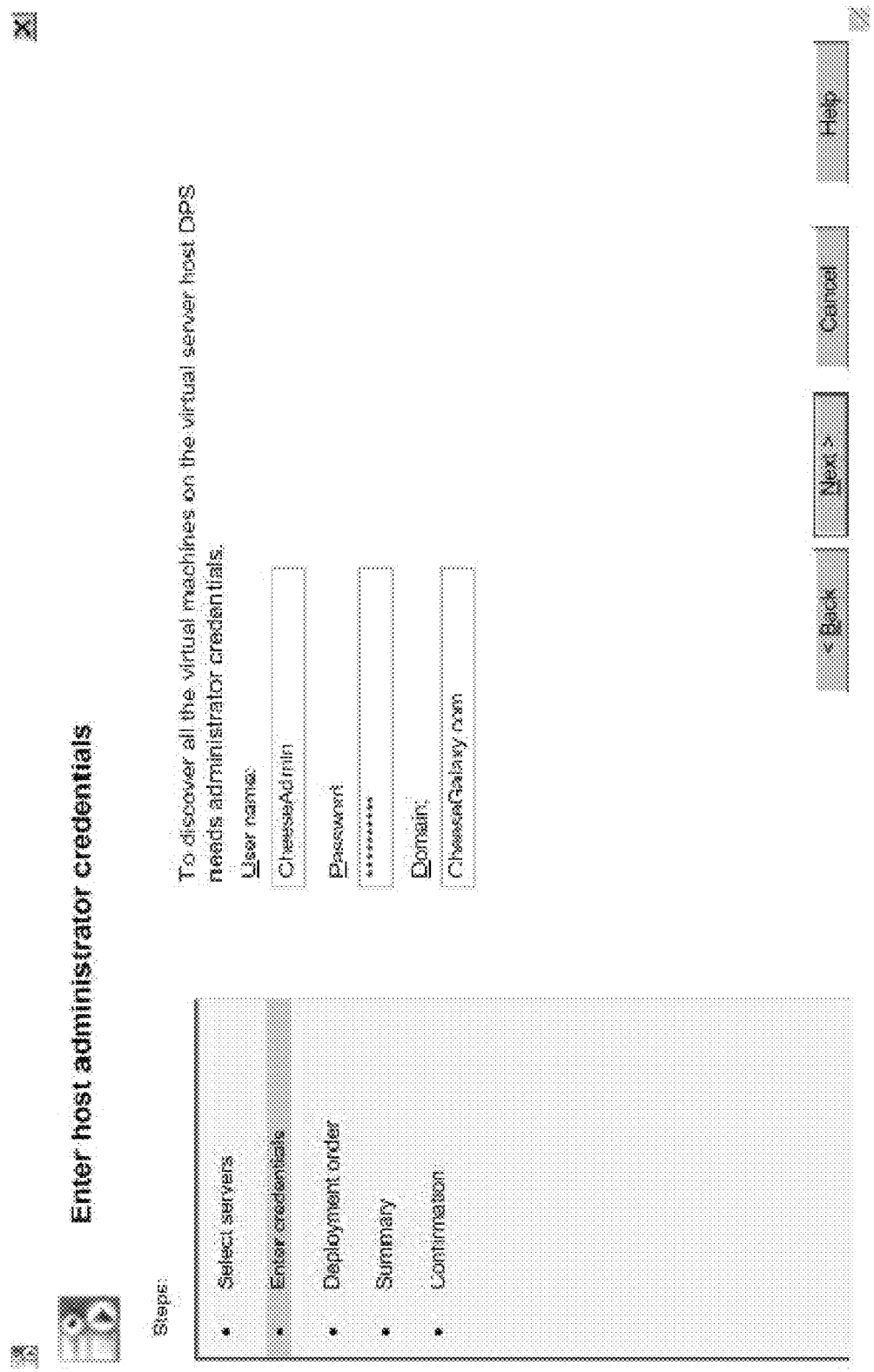
FIGS. 11-13 are screen shots that illustrate some exemplary user interfaces that may be used with various aspects of the invention.
Figure 12:
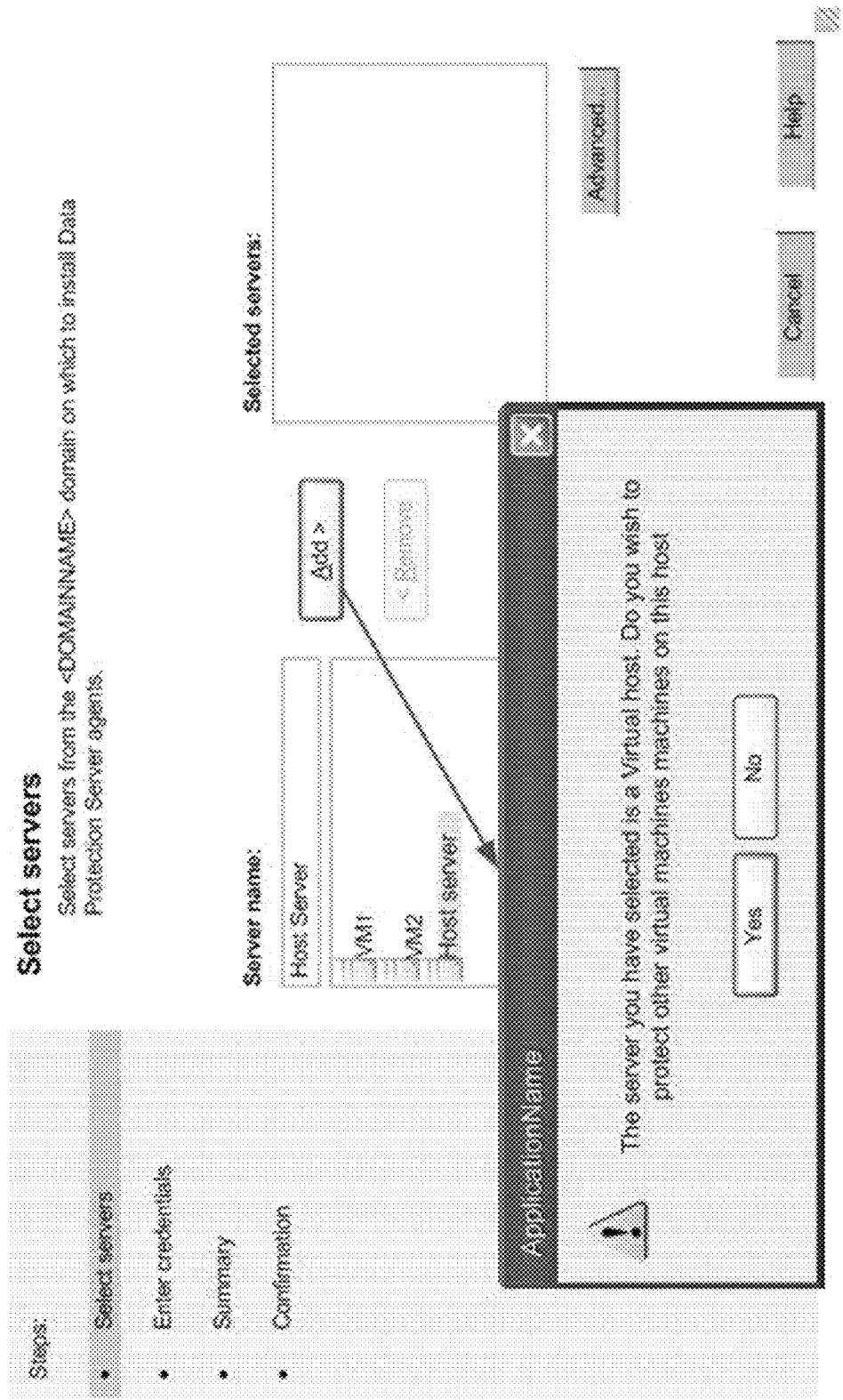
Figure 13:
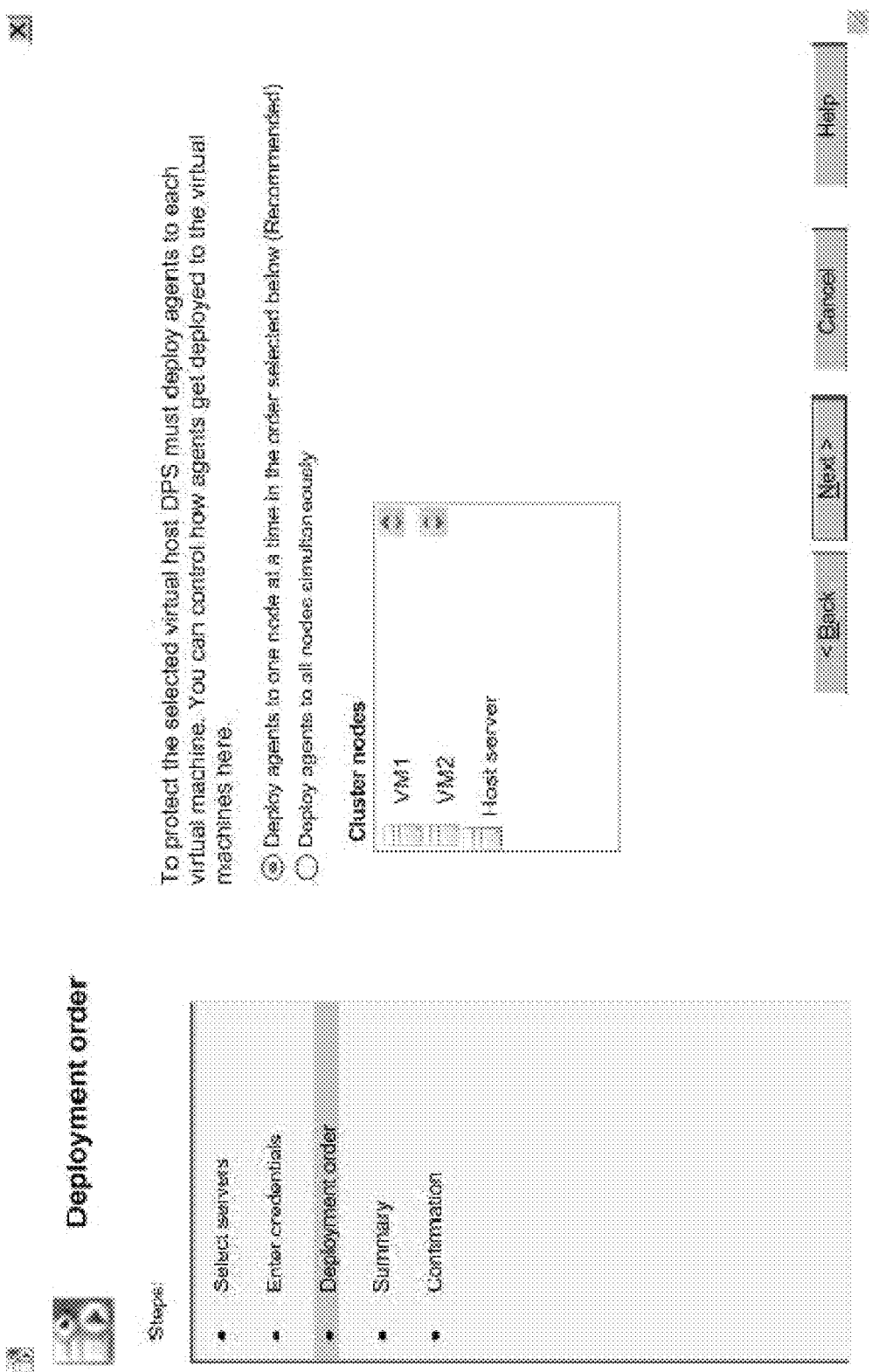

FIGS. 11-13 are screen shots that illustrate some exemplary user interfaces that may be used with various aspects of the invention. Turning to FIG. 11, a system administrator may log on to discover all machines that belong to a particular domain. Turning to FIG. 12, after discovery, the system administrator may select host machines or virtual machines to protect by a data protection server. Such machines may need to have a DPS agent installed. Turning to FIG. 13, a system administrator may select what order to install agents on the selected machines. It will be recognized that these user interfaces are exemplary and that other user interfaces may be used without departing from the spirit or scope of the present invention.

As can be seen from the foregoing detailed description, there is provided a method and system for backing up and restoring data of virtual machines. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed:

1. A method comprising:
    discovering a plurality of host machines via a network;
    connecting a first machine to a host machine of the plurality of host machines via the network and installing an agent on the host machine of the plurality of the host machines, the agent being configured to discover, by querying a directory service, one or more virtual machines hosted by the host machine of the plurality of host machines and communicate the discovered virtual machines to the first machine, the virtual machines associated with storage volumes;
    instantiating replicas of the storage volumes based on configuration data discovered by the agent and sent to the first machine by the agent;
    receiving, by the first machine from the agent, changes to the storage volumes associated with the discovered virtual machines, saving the changes in a file associated with the discovered virtual machines, and storing the changes in one or more of the replicas, the changes having been monitored by the agent;
    receiving information indicative of a request to restore a virtual machine from a corresponding replica that corresponds to the virtual machine associated with the request;
    sending data associated with the corresponding replica to the agent; and
    causing the agent to restore the requested virtual machine by way of the sent data.

2. The method of claim 1, wherein the agent is configured to generate a log file that includes the updates.

3. The method of claim 2, further comprising updating the replica on the first machine with the updates wherein the updating comprises at least modifying the replica as indicated in the log file.

4. The method of claim 1, further comprising monitoring changes to the volume wherein the monitoring comprises creating a differencing disk on a host machine upon which at least one virtual machine resides, the differencing disk maintaining changes to the volume.

5. The method of claim 4, further comprising updating the replica on the first machine with the changes wherein the updating comprises at least merging the differencing disk with a disk stored on the first machine.

6. The method of claim 1, further comprising receiving a list of virtual machines at the first machine.

7. The method of claim 2, further comprising:
    pausing at least one virtual machine;
    inserting a checkpoint record into the log file;
    unpausing at least one virtual machine after the record is inserted; and
    forwarding data in the log file up to the record to the first machine; and flushing data of the log file up to the record.

8. A computer-readable storage medium storing computer-readable instructions that upon execution on a computing device cause acts comprising:
    sending an agent, over a computer network, to a host machine of a plurality of host machines, the agent operable to discover, by querying a directory service, a plurality of virtual machines hosted by the host machine of the plurality of host machines and communicate the discovered virtual machines to a first machine, the virtual machines associated with storage volumes;
    instantiating replicas of the storage volumes based on configuration data discovered by the agent;
    receiving, by the first machine from the agent, changes to the storage volumes associated with the discovered virtual machines that are monitored by the agent using a file system filter configured to save the changes in a file associated with the discovered virtual machines;
    receiving from the agent over the computer network the changes to the volumes associated with the discovered virtual machines, the changes saved in the file, and storing the changes in a replica, the changes having been monitored by the agent;
    receiving information indicative of a request to restore a virtual machine from a corresponding replica that corresponds to the virtual machine associated with the request;
    sending data associated with the corresponding replica to the agent; and
    causing the agent to restore the requested virtual machine by way of the sent data.

9. The computer-readable storage medium of claim 8, wherein the changes are monitored by generating a log file that includes the changes.

10. The computer-readable storage medium of claim 9, further storing computer-readable instructions that upon execution on the computing device cause acts comprising updating a replica of the volume on the computing device with the changes wherein the updating comprises at least modifying the replica as indicated in the log file.

11. The computer-readable storage medium of claim 8, further storing computer readable instructions that upon execution on the computing device cause acts comprising tracking changes to the volume wherein the tracking comprises creating a differencing disk on a host machine upon which at least one virtual machine resides, the differencing disk maintaining changes to the volume.

12. The computer-readable storage medium of claim 11, further storing computer readable instructions that upon execution on the computing device cause acts comprising updating the replica on the computing device with the changes wherein the updating comprises at least merging the differencing disk with a disk stored on the computing device.

13. The computer-readable storage medium of claim 8, further storing computer-readable instructions that upon execution on the computing device cause acts comprising providing a list of the discovered virtual machines to the first machine.

14. The computer-readable storage medium of claim 9, further storing computer-readable instructions that upon execution on the computing device cause acts comprising:
    pausing at least one virtual machine;
    inserting a checkpoint record into the log file;
    unpausing the at least one virtual machine after the record is inserted;
    forwarding data in the log file up to the record to the computing device; and
    flushing data of the log file up to the record.

15. An apparatus comprising:
a storage device;
a computing device configured to communicate with the storage device when the apparatus is operational; and
a memory in communication with the computing device when the apparatus is operational, the memory storing computer instructions that upon execution on a processor at least cause the computing device to:
discover, by querying a directory service, a host machine connected to the computing device over a network, the host machine hosting at least one virtual machine, the host machine associated with a network of a plurality of host machines, the at least one virtual machine operable to cause changes to volumes associated with the at least one virtual machine;
transmit an agent over a computer network to the discovered host machine and cause an installation of the agent on the discovered host machine, the agent configured to monitor changes to the volumes associated with the at least one virtual machine and communicate the monitored changes to the computing device;
cause instantiation of replicas of the volumes based on configuration data discovered by the agent and sent to the computing device by the agent;
receive, by the computing device from the agent, the changes to the volumes associated with the at least one virtual machine, the changes having been monitored by the agent and saved in a file associated with the at least one virtual machine;
process the received changes and store on the storage device the received changes to the replicas of the volumes;
receive information from a client device indicative of a request to restore a virtual machine from a corresponding replica on the storage device that corresponds to a virtual machine associated with the request;
send data associated with the corresponding replica to the agent; and
cause the agent to restore the requested virtual machine by way of the sent data.

16. The apparatus of claim 15 having further stored in the memory computer instructions that upon execution on the computer device at least cause updating of the replica with the changes by at least modifying the replica as indicated in the log file.

* * * * *